(12) United States Patent
Peng et al.

(10) Patent No.: US 8,994,239 B2
(45) Date of Patent: Mar. 31, 2015

(54) AXIAL FLUX HALBACH ROTOR

(71) Applicant: Industrial Technology Research Institute, Hsin-Chu (TW)

(72) Inventors: Wen-Yang Peng, Hsinchu County (TW); Han-Ping Yang, Hsinchu (TW); Cheng-Hsuan Lin, Taoyuan County (TW); Chau-Shin Jang, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 278 days.

(21) Appl. No.: 13/793,292

(22) Filed: Mar. 11, 2013

(65) Prior Publication Data

US 2014/0132102 A1    May 15, 2014

(30) Foreign Application Priority Data

Nov. 9, 2012 (TW) .............................. 101141807 A

(51) Int. Cl.
*H02K 1/27* (2006.01)

(52) U.S. Cl.
CPC .................................... *H02K 1/2793* (2013.01)
USPC ............ 310/156.07; 310/156.02; 310/156.36; 310/156.43

(58) Field of Classification Search
CPC .... H02K 1/2793; H02K 21/24; H02K 1/2766
USPC ............. 310/156.02, 156.07, 156.25, 156.32, 310/156.36, 156.62, 156.64, 266, 268
See application file for complete search history.

(56) References Cited

U.S. PATENT DOCUMENTS

| 6,373,162 | B1* | 4/2002 | Liang et al. | 310/156.53 |
| 7,034,422 | B2 | 4/2006 | Ramu | |
| 7,315,102 | B2* | 1/2008 | Minagawa | 310/156.32 |
| 2004/0070307 | A1* | 4/2004 | Haugan et al. | 310/268 |

(Continued)

FOREIGN PATENT DOCUMENTS

| CN | 1205728 | 1/1999 |
| CN | 201887638 | 6/2011 |

(Continued)

OTHER PUBLICATIONS

Taiwan Patent Office, "Office Action", Sep. 5, 2014.

(Continued)

*Primary Examiner* — Thanh Lam
(74) *Attorney, Agent, or Firm* — WPAT, PC; Justin King

(57) ABSTRACT

An axial flux Halbach rotor comprise: a first magnet set and a second magnet set. Further comprises: a plurality of first magnets that are respective featured by their respective first magnetizing directions and are arranged interconnecting to each other by the use of a first connecting element while allowing any two neighboring first magnets to be spaced from each other by a first distance; and the second magnet set further comprises: a plurality of second magnets that are respectively featured by their respective second magnetizing directions and are arranged interconnecting to each other by the use of a second connecting element while allowing any two neighboring second magnets to be spaced from each other by a second distance. In addition, the first magnet set and the second magnet set are arranged inlaid into each other while allowing the plural first magnets and the plural second magnets to be dispose alternatively.

15 Claims, 10 Drawing Sheets

(56) References Cited

U.S. PATENT DOCUMENTS

| | | | |
|---|---|---|---|
| 2009/0295245 A1 | 12/2009 | Abe et al. | |
| 2010/0231079 A1* | 9/2010 | Abe et al. | 310/156.35 |
| 2012/0262022 A1* | 10/2012 | Takemoto et al. | 310/156.35 |
| 2013/0009508 A1* | 1/2013 | Takamatsu et al. | 310/156.35 |

FOREIGN PATENT DOCUMENTS

| | | |
|---|---|---|
| CN | 201956858 | 8/2011 |
| CN | 102195403 | 9/2011 |
| CN | 202034879 | 11/2011 |
| CN | 202085045 | 12/2011 |
| EP | 2355313 A1 | 8/2011 |
| JP | 2010-98929 A | 4/2010 |
| TW | 200620784 A | 6/2006 |
| TW | 201025793 | 7/2010 |
| TW | 201230618 | 7/2012 |
| WO | 2007/091727 A1 | 8/2007 |
| WO | 2011076740 | 6/2011 |

OTHER PUBLICATIONS

R. P. Praveen, M. H. Ravichandran, V. T. Sadasivan Achari, V. P. Jagathy Raj, G. Madhu, and G. R. Bindu, "A Novel Slotless Halbach-Array Permanent-Magnet Brushless DC Motor for Spacecraft Applications", IEEE Transactions on Industrial Electronics, vol. 59, No. 9, Sep. 2012.

Qinghua Han, "Analysis and Modeling of the EDS Maglev System Based on the Halbach Permanent Magnet Array", Department of Electrical and Computer Engineering in the College of Engineering and Computer Science at the University of Central Florida Orlando, Florida, 2004.

Seok-Myeong Jang, Sung-Ho Lee, and In-Ki Yoon, "Design Criteria for Detent Force Reduction of Permanent-Magnet Linear Synchronous Motors With Halbach Array", IEEE Transactions on Magnetics, vol. 38, No. 5, Sep. 2002.

Jae-Seok Choi and Jeonghoon Yoo, "Design of a Halbach Magnet Array Based on Optimization Techniques", IEEE Transactions on Magnetics, vol. 44, No. 10, Oct. 2008.

A. Sarwar, A. Nemirovski, B. Shapiro, "Optimal Halbach permanent magnet designs for maximally pulling and pushing nanoparticles", Journal of Magnetism and Magnetic Materials 324 (2012) 742-754.

Jan Sandtner and Hannes Bleuler "Electrodynamic Passive Magnetic Bearing With Planar Halbach Arrays", Ninth International Symposium on Magnetic Bearings, Aug. 3-6, 2004, Lexington, Kentucky, USA.

* cited by examiner

AXIAL FLUX HALBACH ROTOR

CROSS REFERENCE TO RELATED APPLICATION

This application also claims priority to Taiwan Patent Application No. 101141807 filed in the Taiwan Patent Office on Nov. 9, 2012, the entire content of which is incorporated herein by reference.

TECHNICAL FIELD

The present disclosure relates to an axial flux Halbach rotor, and more particularly, to an axial flux rotor structure with modularized magnet assembly of Halbach magnetization pattern.

BACKGROUND

With the increasing popularity of brushless DC motor in the application of household appliances and the increasing demand for light-weight low cost products, modern motors not only are designed to be more energy-saving and fabricated using lighter and thinner material, but at the same time should be able to achieve good power output with improved torque density. Conventionally, torque density of a motor is enhanced by the use of rare earth magnets of high magnetic energy product in the motor. However, since the supply and availability of such rare earth magnets is near monopolized, the cost can be significantly high for such motors.

Compared with traditional motor, Halbach motor has higher air-gap flux density since a Halbach array is a special arrangement of permanent magnets with different magnetic field orientations that augments the magnetic field on one side of the array while cancelling the field to near zero on the other side, which attributes to higher magnetic flux density. Nevertheless, since there is no automatic means for assembling magnets into a Halbach array, it is still a difficult task to manufacture a Halbach rotor is a difficult task.

Therefore, it is in need of a quick and simple process for manufacturing a super-thin high-performance inlaid motor that is able to achieve a high torque density or a high power density through the increasing in magnetic flux density and magnet utilization without causing the overall thickness of the motor to increase.

SUMMARY

The present disclosure relates to an axial flux rotor structure with modularized magnet assembly of Halbach magnetization pattern.

In an exemplary embodiment, the present disclosure provides an axial-flux Halbach rotor, comprising: a first magnet set and a second magnet set, in which the first magnet set further comprises: a plurality of first magnets that are respectively featured by their respective first magnetizing directions and are arranged interconnecting to each other by the use of a first connecting element while allowing any two neighboring second magnets to be spaced from each other by a first distance; and the second magnet set further comprises: a plurality of second magnets that are respectively featured by their respective second magnetizing directions and are arranged interconnecting to each other by the use of a second connecting element while allowing any two neighboring second magnets to be spaced from each other by a second distance. In an embodiment, the first magnetizing directions are orientated perpendicular to the second magnetizing directions; the first magnet set and the second magnet set are arranged inlaid into each other while allowing the plural first magnets and the plural second magnets to be dispose alternatively.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
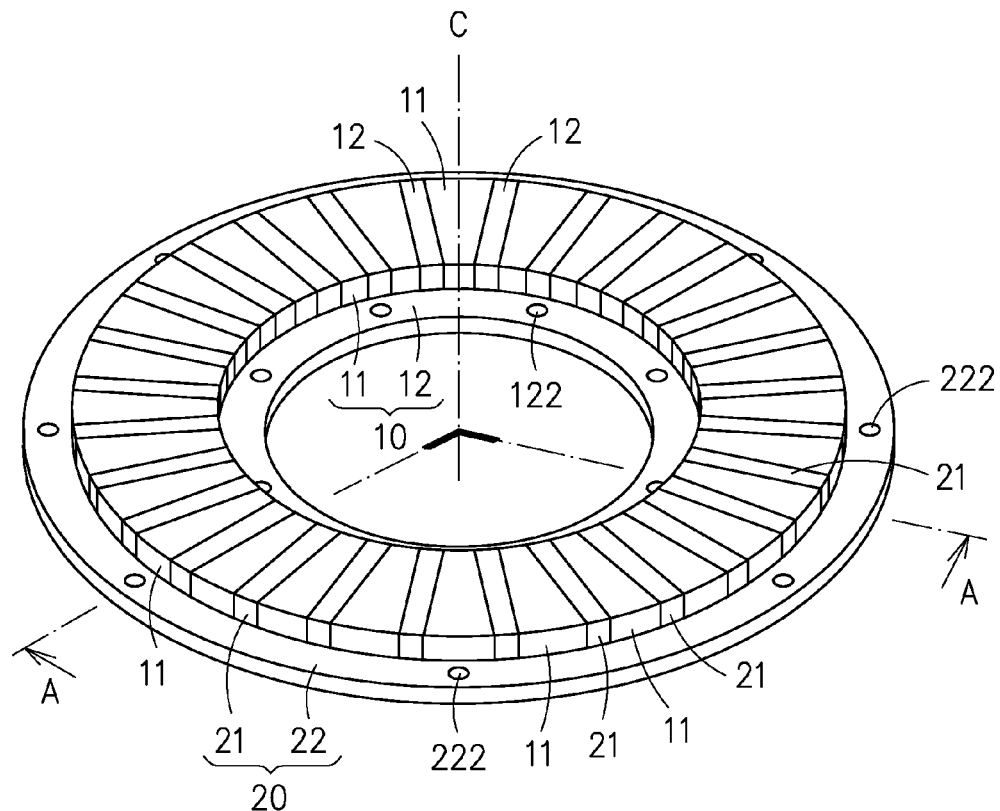
FIG. 1 is a three-dimensional view of an axial flux Halbach rotor according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 3:
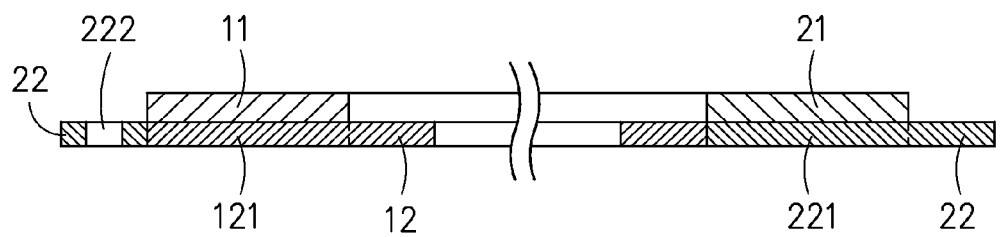
FIG. 3 is an A-A cross sectional view of the axial flux Halbach rotor of FIG. 1.
Figure 2:
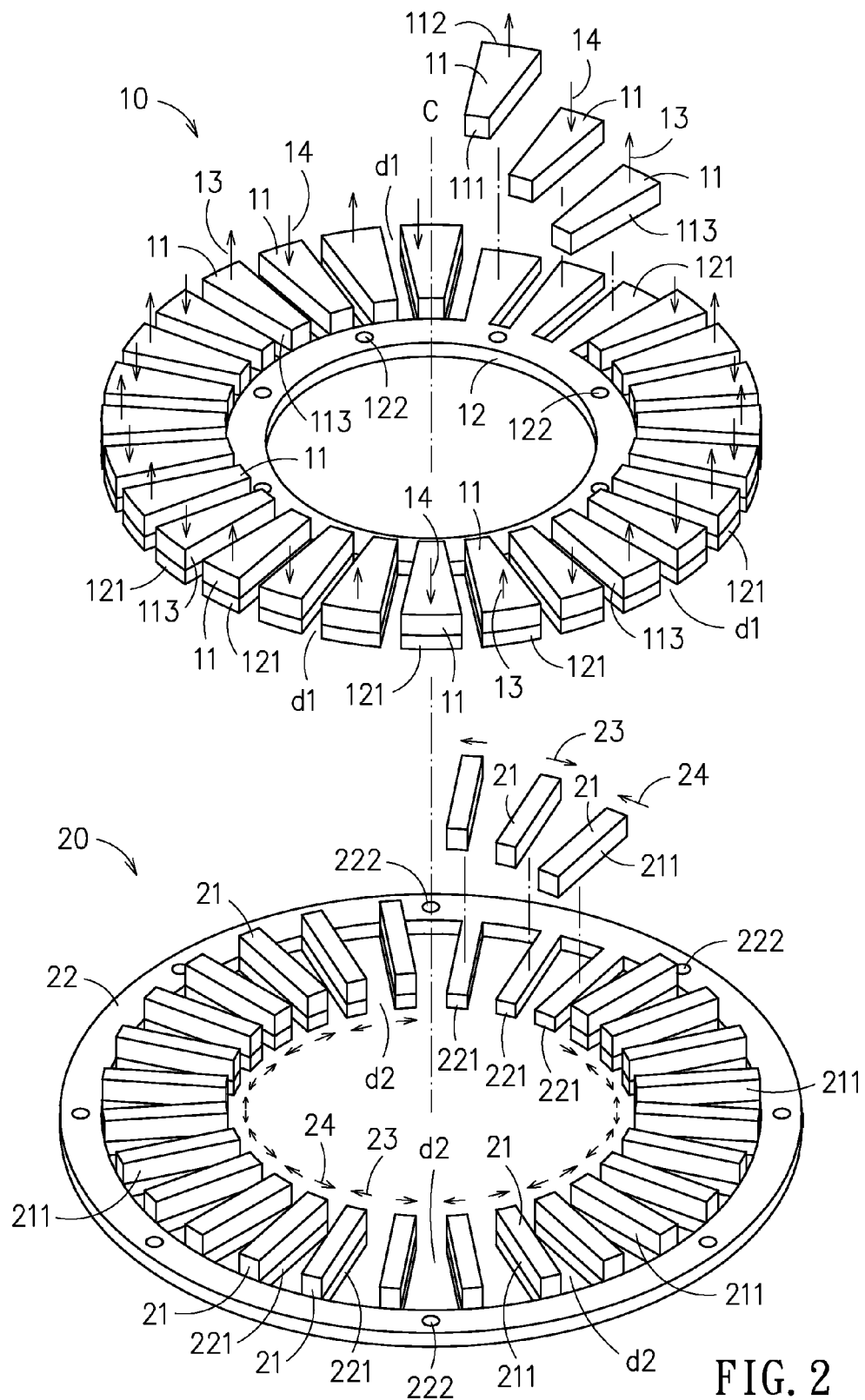
FIG. 2 is an exploded view of the axial flux Halbach rotor of FIG. 1.

In an exemplary embodiment shown in FIG. 1 to FIG. 3, an axial flux Halbach rotor of the present disclosure is disclosed, which comprises: a first magnet set 10 and a second magnet set 20.

The first magnet set 10 includes a plurality of first magnets 11 and a first connecting element 12. Wherein, each of the plural first magnets 11 is formed as a fan and is configured with a first end 111 and a second end 112 that are arranged opposite to each other while allowing the first magnet 11 to connected to the outer rim of the first connecting element 12 by the first end 111, and the first end 111 is formed in a size larger than that of the second end 112. In addition, the first connecting element 12 can be made of a nonmagnetic material or a magnetic material and is formed as a ring with a first axial direction C. Moreover, the first connecting element 12 includes a plurality of first substrates 121 that are also capable of being made of a nonmagnetic material or a magnetic material and are arranged centering around the first axial direction C while surrounding the outer rim of the first connecting element 12. In this embodiment, each of the first substrates 121 is formed in a shape the same as that of the first magnet 11, and thus the plural first magnets 11 are respectively disposed on the plural first substrates 121 in a one-by-one manner while allowing the plural first magnets 11 to interconnect to one another by the first connecting element 12 and simultaneously enabling the plural first magnets 11 to be arranged centering around the first axial direction C while surrounding the outer rim of the first connecting element 12. Thereby, any two first magnets that are disposed neighboring to each other is spaced by a specific first distance d1. As shown in FIG. 2, the plural first magnets 11 are respectively featured by their respective first magnetizing directions, and the first magnetizing direction for each of the plural first magnets 11 is a direction selected from the group consisting of: a first forward direction 13 and a first reverse direction 14, that are orientated opposite to each other. It is noted that the terms "forward", and "reverse" are used for indicating two opposite direction and has no relation relating to "position" or "negative" in electrical attributes. In FIG. 2, the forward direction 13 is indicated by an upward-pointing arrow and the reverse direction 14 is indicated by a downward-pointing arrow, but both directions are arranged parallel to the first axial direction C. In addition, the first magnetizing directions for any two neighboring first magnets 11 are enabled to be opposite to each other in a manner that when the first magnetizing direction of one of the two neighboring first magnets 11 is selected to be the first forward direction 13, the first magnetizing direction of another first magnet 11 will be the first reverse direction 14, and vice verse.

The second magnet set 20 includes a plurality of second magnets 21 and a second connecting element 22. Wherein, each of the plural first magnets 21 is formed as a rectangle. In addition, the second connecting element 22 can be made of a nonmagnetic material or a magnetic material and is formed as a ring with a second axial direction that is arranged coaxial to the first axial direction C. Moreover, the second connecting element 22 includes a plurality of second substrates 221 that are also capable of being made of a nonmagnetic material or a magnetic material and are arranged centering around the first axial direction C while surrounding the inner rim of the second connecting element 22. In this embodiment, each of the second substrates 221 is formed in a shape the same as that of the second magnet 21, and thus the plural second magnets 21 are respectively disposed on the plural second substrates 221 in a one-by-one manner while allowing the plural second magnets 21 to interconnect to one another by the second connecting element 22 and simultaneously enabling the plural second magnets 21 to be arranged centering around the first axial direction C while surrounding the inner rim of the second connecting element 22. Thereby, any two second magnets 21 that are disposed neighboring to each other is spaced by a specific second distance d2. As shown in FIG. 2, the plural second magnets 21 are respectively featured by their respective second magnetizing directions, and the second magnetizing direction for each of the plural second magnets 21 is a direction selected from the group consisting of: a second forward direction 23 and a second reverse direction 24, that are orientated opposite to each other. It is noted that the terms "forward", and "reverse" are used for indicating two opposite direction and has no relation relating to "position" or "negative" in electrical attributes. In addition, the second magnetizing directions for any two neighboring second magnets 21 are enabled to be opposite to each other in a manner that when the second magnetizing direction of one of the two neighboring second magnets 21 is selected to be the second forward direction 23, the second magnetizing direction of another second magnet 21 will be the second reverse direction 24, and vice verse. In this embodiment, for each second magnet 21, its second magnetizing direction is orientated parallel to a tangential direction relating to the part of the ring-like the second connecting element 22 that is positioned corresponding to the referring second magnet 21.

Each of the first magnets 11 and the second magnets 21 can be a sintered magnet, a bonded magnet, an injection plastic magnet, an isotropic magnet, or an anisotropic magnet; and each of the first connecting element 12, the first substrate 121, the second connecting element 22 and the second substrate 221 can be made of plastic steel, aluminum, low carbon steel or silicon steel. It is noted that the connection between the plural first magnets 11 and the first connecting element 12 or their respective first substrates 121 can be enabled by welding or buckling, which is also true for the connection between the plural second magnets 21 and the second connecting element 22 or their respective second substrates 221. The magnetization of each of the first magnets 11 and second magnets 21 can be enabled individually using a magnetizing tool after completing the assembling of the first magnet set 10 and the second magnet set 20, or can be achieved using an injection molding tool with magnetization unit in a manner similar for producing injection molding magnets.

The first magnet set 10 and the second magnet set 20 are arranged inlaid into each other while allowing the plural first magnets 11 and the plural second magnets 21 to be dispose alternatively, and thereby, the plural first magnets 11 and the plural second magnets 12 are alternatively disposed and inlaid to form a flat-cylinder like rotor, as shown in FIG. 1. In addition, there are holes 122, 222 formed respectively on the first connecting element 12 and the second connecting element 22, which are provided for fixing parts such as bolts or locating pins to insert therein so as to fixedly securing the rotor assembling of the first and second magnet sets 10, 20.

In the embodiment shown in FIG. 1, for each of the plural first magnets 11, its surfaces 113 whichever are disposed neighboring to one of the plural second magnets 21 is featured by an extending direction that is parallel to the first axial direction C; and that is also true for the surface 211 of each second magnet 21. That is, the surfaces 113 and 211 that are formed respectively on two neighboring first and second magnets 11, 21 are vertical surfaces that are orientated parallel to each other. The assembled structure of FIG. 1 can be achieved either by insetting the first magnet set 10 into the second magnet set 20 from the top of the second magnet set 20, or by insetting the first magnet set 10 into the second magnet set 20 from the bottom of the second magnet set 20.

Figure 4:
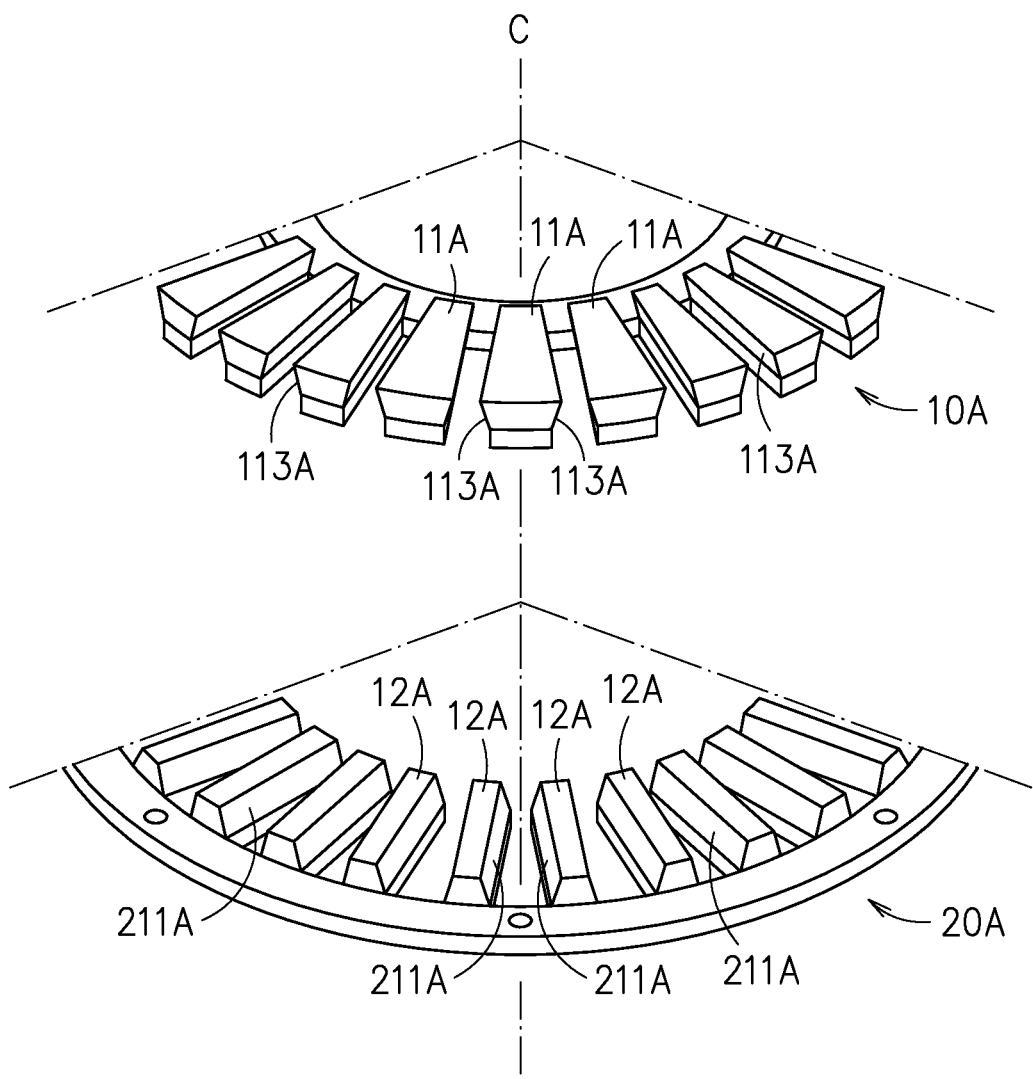
FIG. 4 is a partial exploded view of an axial flux Halbach rotor according to another embodiment of the present disclosure.

Please refer to FIG. 4, which is a partial exploded view of an axial flux Halbach rotor according to another embodiment of the present disclosure. As shown in FIG. 4, for each of the plural first magnets 11A in the first magnet set 10A, its surfaces 113A whichever are disposed neighboring to one of the plural second magnets 21A in the second magnet set 20A is a ramped surface and is featured by an extending direction that forms an included angle with the first axial direction C; and that is also true for the surfaces 211A of each second magnets 21A in the second magnet set 20A. In the embodiment shown in FIG. 4, the assembling of the first magnet set 10A and the second magnet set 20A can only be achieved by insetting the first magnet set 10A into the second magnet set 20A from the top of the second magnet set 20A.

Figure 5:
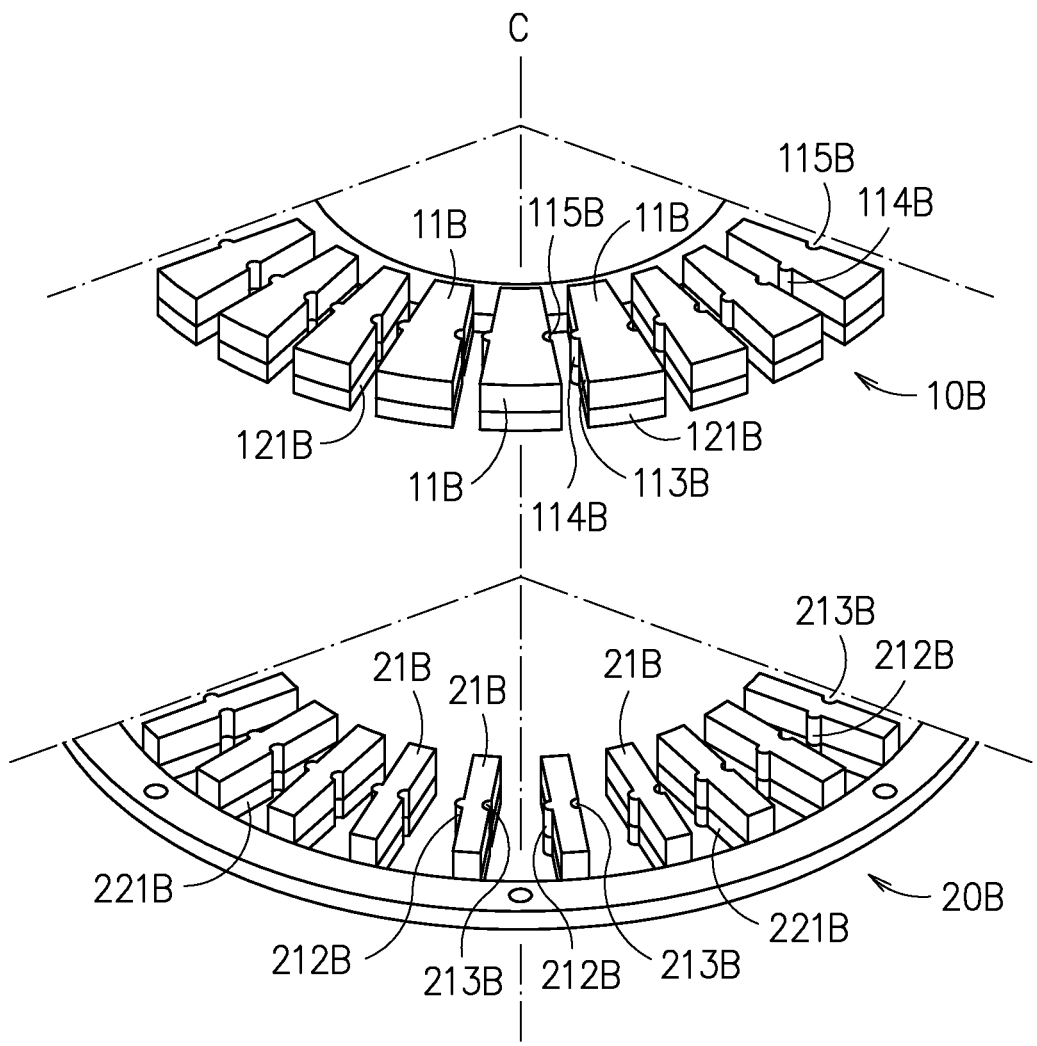
FIG. 5 is a partial exploded view of an axial flux Halbach rotor according to yet another embodiment of the present disclosure.

In an embodiment shown in FIG. 5, there are at least one fastening element arranged at a position between any two neighboring first magnet 11B and second magnet 21B so as to be used for enabling the two neighboring first magnet 11B and second magnet 21B to coupled tightly and inlay into each other. As shown in FIG. 5, each fastening element substantially the combination of an assembly of a protrusion 114B and a recess 213B that are arranged respectively on neighboring surfaces 113B, 211B of the first and the second magnets 11B, 21B at positions that are corresponding to each other, and an assembly of a recess 115B and a protrusion 212B that are arranged respectively on neighboring surfaces 113B, 211B of the first and the second magnets 11B, 21B at positions that are corresponding to each other. In this embodiment, the protrusion 114B and the recess 115B of each first magnet 11B as well as those 212B and 213B of the second magnet 21B are all formed as bar-like structures extending from the first substrate 121B to the corresponding second substrate 221B. By the aligning and engaging of the protrusion into the corresponding recess, the first magnets 11B can be engaged and coupled tightly to their corresponding second magnets 21B, and thus the first magnet set 10B can be assembled with the second magnet set 20B. It is noted that the configuration, amount and position of the fastening element can be varied and are not limited by the present embodiment.

Figure 6:
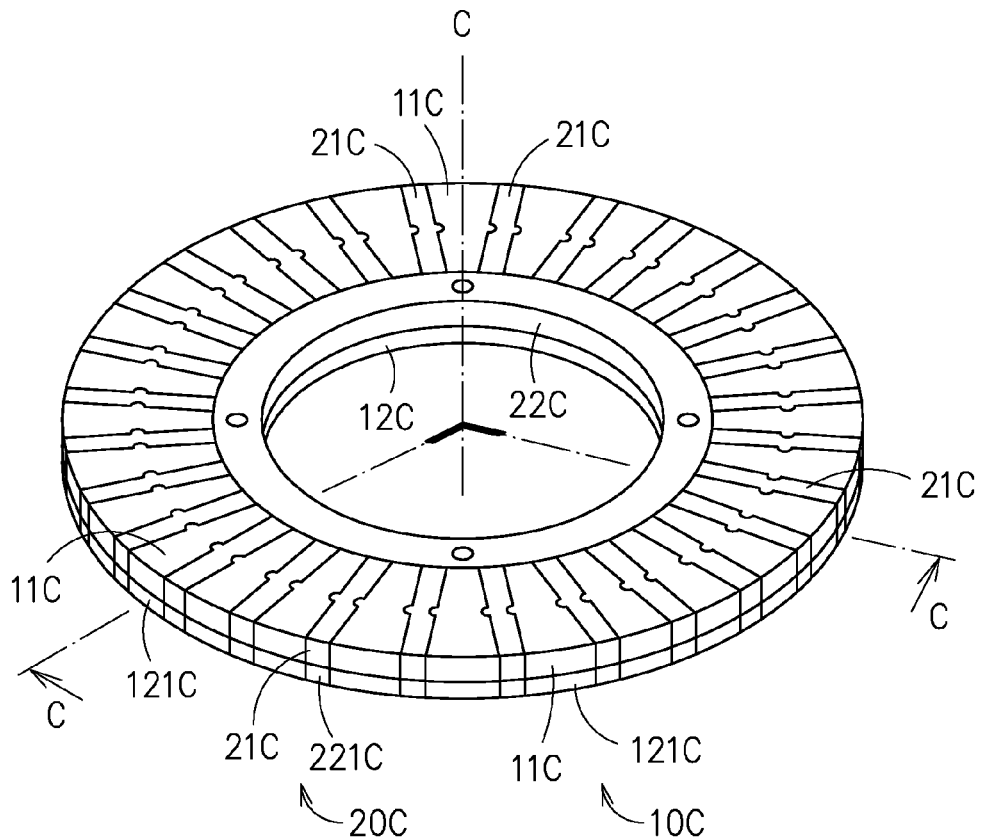
FIG. 6 is a three-dimensional view of an axial flux Halbach rotor according to another embodiment of the present disclosure.
Figure 8:
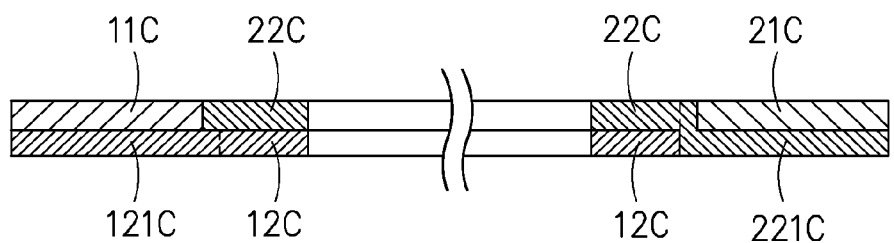
FIG. 8 is a C-C cross sectional view of the axial flux Halbach rotor of FIG. 6.
Figure 7:
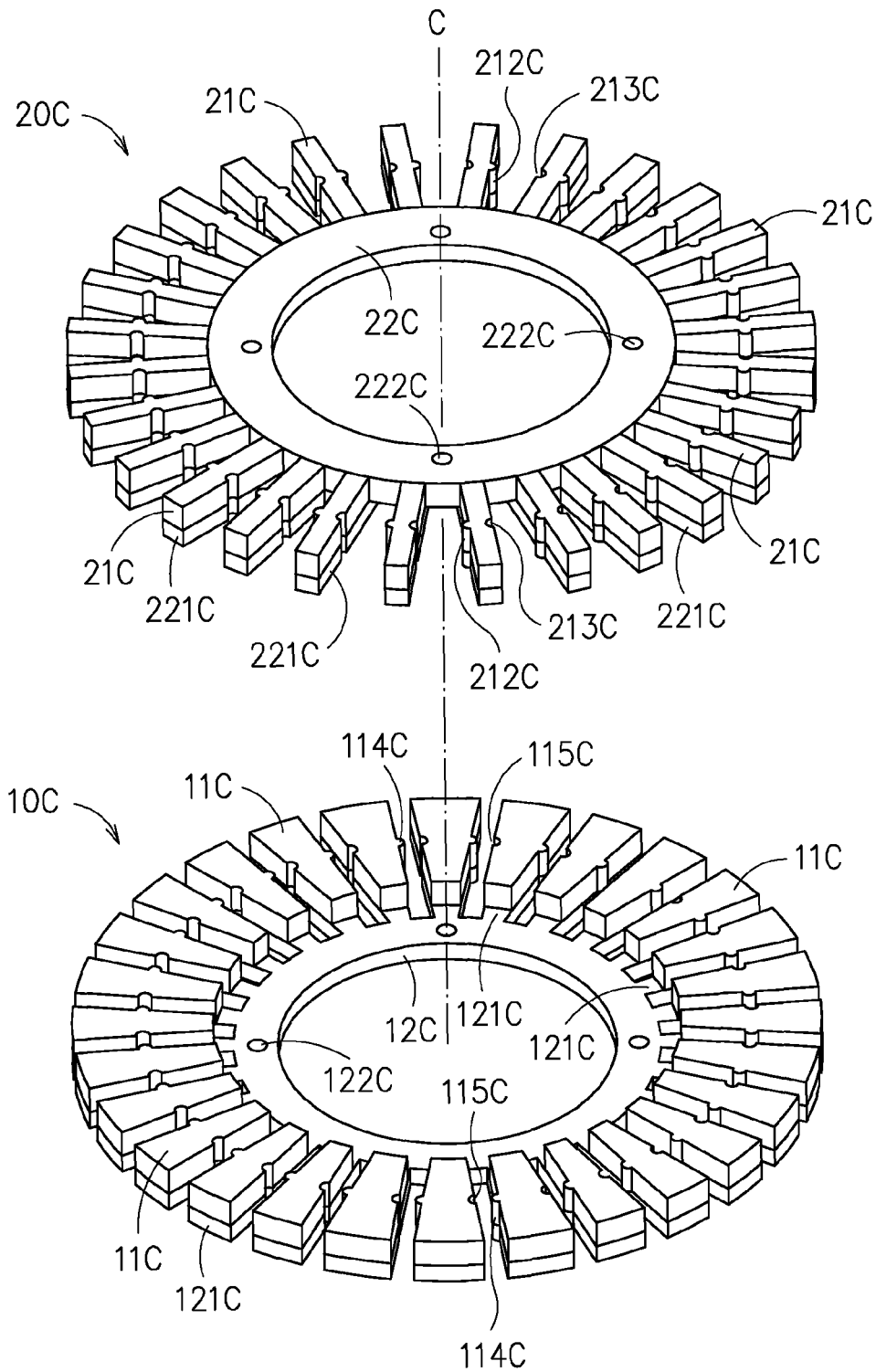
FIG. 7 is an exploded view of the axial flux Halbach rotor of FIG. 6.

In an exemplary embodiment shown in FIG. 6 to FIG. 8, an axial flux Halbach rotor of the present disclosure is disclosed, which comprises: a first magnet set 10C and a second magnet set 20C. The first magnet set 10C includes a plurality of first magnets 11C and a ring-like first connecting element 12C with an axial direction C. Wherein, the first connecting element 12C includes a plurality of first substrates 121C that are arranged centering around the axial direction C while surrounding the outer rim of the first connecting element 12C. In this embodiment, the plural first magnets 11C are respectively disposed on the plural first substrates 121C in a one-by-one manner while allowing the plural first magnets 11C to interconnect to one another by the first connecting element 12C and simultaneously enabling the plural first magnets 11C to be arranged centering around the axial direction C while surrounding the outer rim of the first connecting element 12C. Similarly, The second magnet set 20C includes a plurality of second magnets 21C and a ring-like second connecting element 22C disposed coaxial to the axial direction C. Wherein, the second connecting element 22C includes a plurality of second substrates 221C that are arranged centering around the axial direction C while surrounding the outer rim of the second connecting element 22C. In this embodiment, the plural second magnets 21C are respectively disposed on the plural second substrates 221C in a one-by-one manner while allowing the plural second magnets 21C to interconnect to one another by the second connecting element 22C and simultaneously enabling the plural second magnets 21C to be arranged centering around the axial direction C while surrounding the outer rim of the second connecting element 22C. Moreover, there are protrusions 114C, recesses 213C, recesses 115C and protrusions 212C that are arranged respectively at neighboring surfaces of the corresponding first and second magnets 11C, 12C, and in this embodiment, the protrusion 114C and recess 115C of each first magnet 11C as well as those 212C and 213C of the second magnet 21C are all formed as bar-like structures extending from the first substrate 121C to the corresponding second substrate 221C. In addition, there are holes 122C, 222C formed respectively on the first connecting element 12C and the second connecting element 22C, which are provided for fixing parts such as bolts or locating pins to insert therein so as to fixedly securing the rotor assembling of the first and second magnet sets 10C, 20C.

Figure 9:
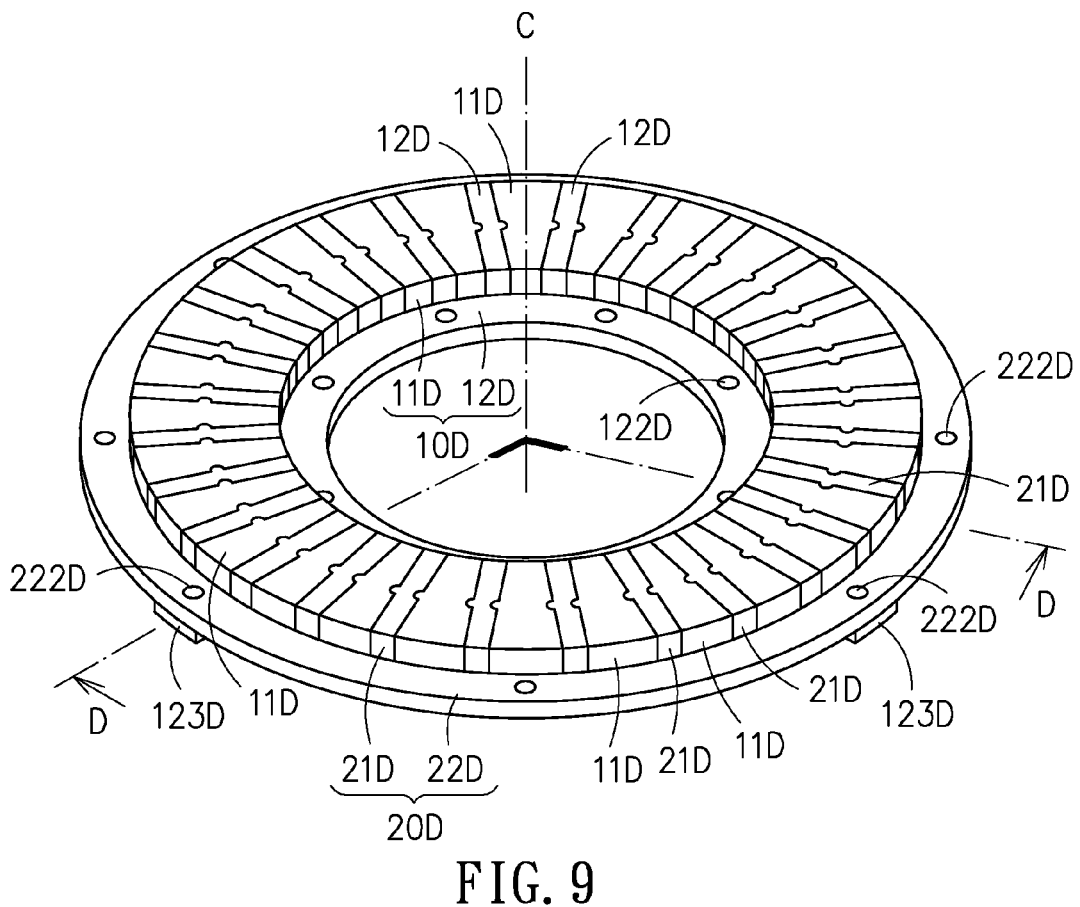
FIG. 9 is a three-dimensional view of an axial flux Halbach rotor according to yet another embodiment of the present disclosure.
Figure 11:
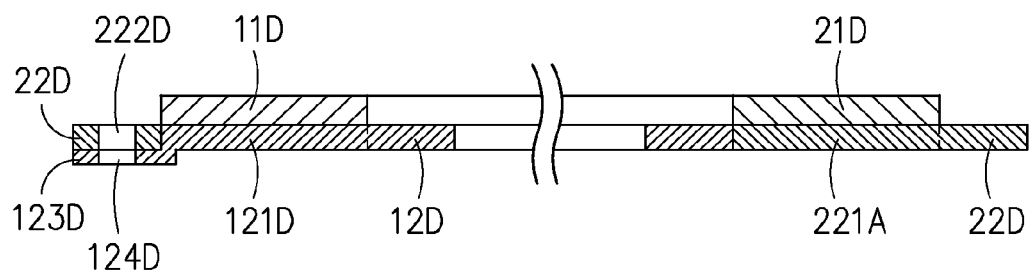
FIG. 11 is a D-D cross sectional view of the axial flux Halbach rotor of FIG. 9.
Figure 10:
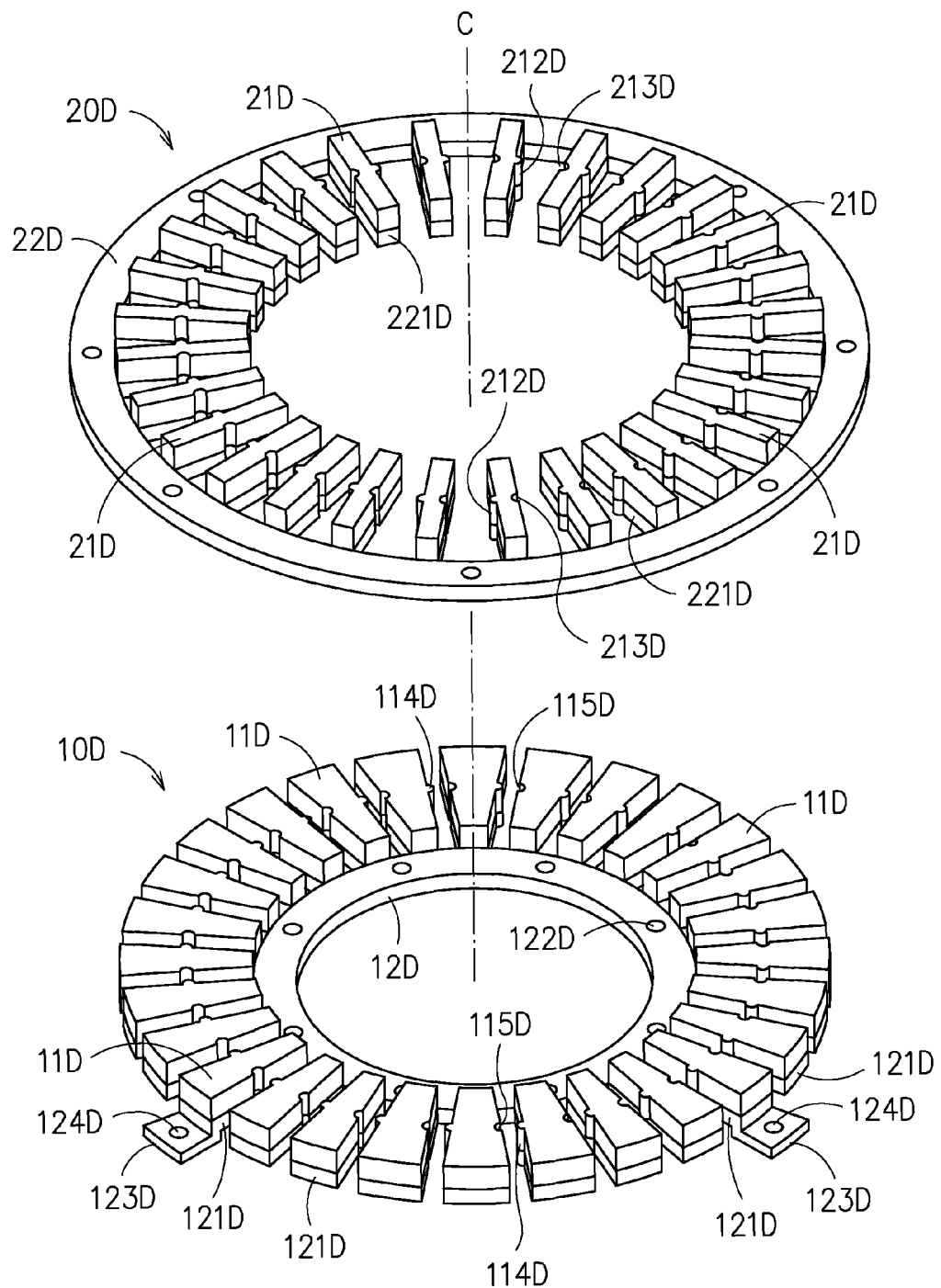
FIG. 10 is an exploded view of the axial flux Halbach rotor of FIG. 9.

In an exemplary embodiment shown in FIG. 9 to FIG. 11, an axial flux Halbach rotor of the present disclosure, being an extended combination of the embodiments shown in FIG. 1 and FIG. 5, is disclosed, which comprises: a first magnet set 10D and a second magnet set 20D. The first magnet set 10D includes a plurality of first magnets 11D and a ring-like first connecting element 12D with an axial direction C. Wherein, the first connecting element 12D includes a plurality of first substrates 121D that are arranged centering around the axial direction C while surrounding the outer rim of the first connecting element 12D. In this embodiment, the plural first magnets 11D are respectively disposed on the plural first substrates 121D in a one-by-one manner while allowing the plural first magnets 11D to interconnect to one another by the first connecting element 12D and simultaneously enabling the plural first magnets 11D to be arranged centering around the axial direction C while surrounding the outer rim of the first connecting element 12D. Similarly, The second magnet set 20D includes a plurality of second magnets 21D and a ring-like second connecting element 22D disposed coaxial to the axial direction C. Wherein, the second connecting element 22D includes a plurality of second substrates 221D that are arranged centering around the axial direction C while surrounding the inner rim of the second connecting element 22D. In this embodiment, the plural second magnets 21D are respectively disposed on the plural second substrates 221D in a one-by-one manner while allowing the plural second magnets 21D to interconnect to one another by the second connecting element 22D and simultaneously enabling the plural second magnets 21D to be arranged centering around the axial direction C while surrounding the inner rim of the second connecting element 22D. Moreover, there are protrusions 114D, recesses 213D, recesses 115D and protrusions 212D that are arranged respectively at neighboring surfaces of the corresponding first and second magnets 11D, 12D. Nevertheless, the present embodiment is characterized in that: for a specific amount of the first substrate 121D that are selected from the plural first substrates 121D, each of which is configured with a supporting panel 123D at an end thereof that is connected to the first connecting element 12D; and each of the supporting panels 123D is disposed on one of the axial surfaces of the second connecting element 22D when the first magnet set 10D and the second magnet set 20D are arranged inlaid into each other. There is no restriction for the supporting panel 123D in number and in position, so that there can be four or any number of supporting panels. In addition, each of the supporting panels 123D is configured with a hole 124D at a position corresponding to the hole 222D formed on a corresponding second connecting element 22D, that are provided for fixing parts such as bolts or locating pins to insert therein so as to fixedly securing the rotor assembling of the first and second magnet sets 10D, 20D. It is noted that the holes 122D on the first connecting element 12D and its corresponding holes 222D on the second connecting element 22D are also provided for fixing parts such as bolts or locating pins to insert therein.

Figure 12:
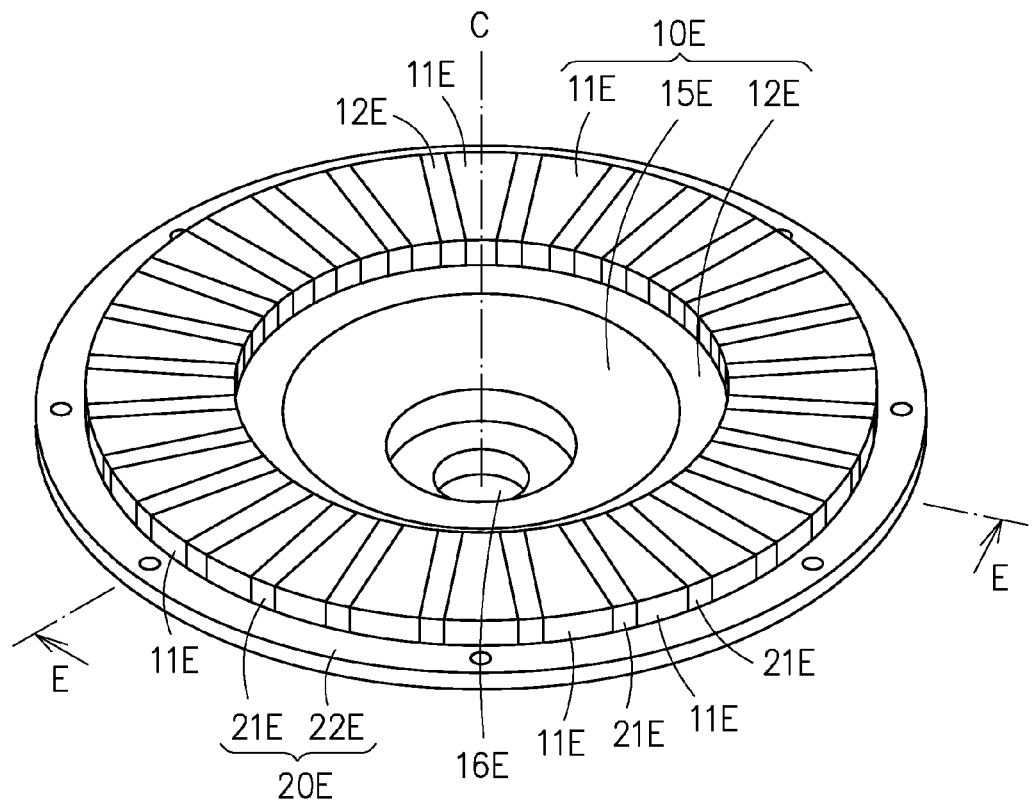
FIG. 12 s a three-dimensional view of an axial flux Halbach rotor according to further another embodiment of the present disclosure.
Figure 14:
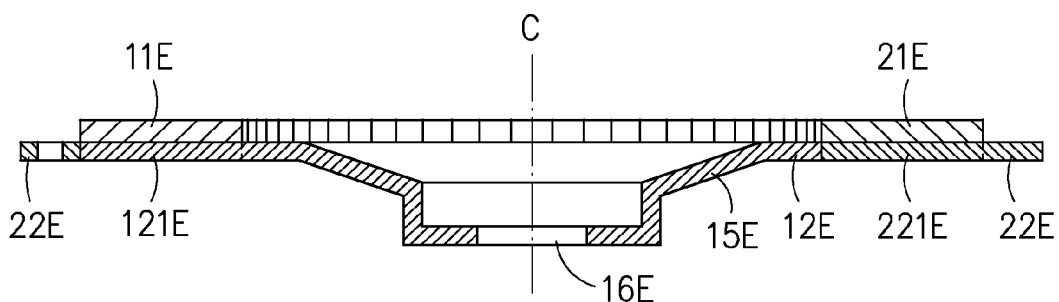
FIG. 14 is an E-E cross sectional view of the axial flux Halbach rotor of FIG. 12.
Figure 13:
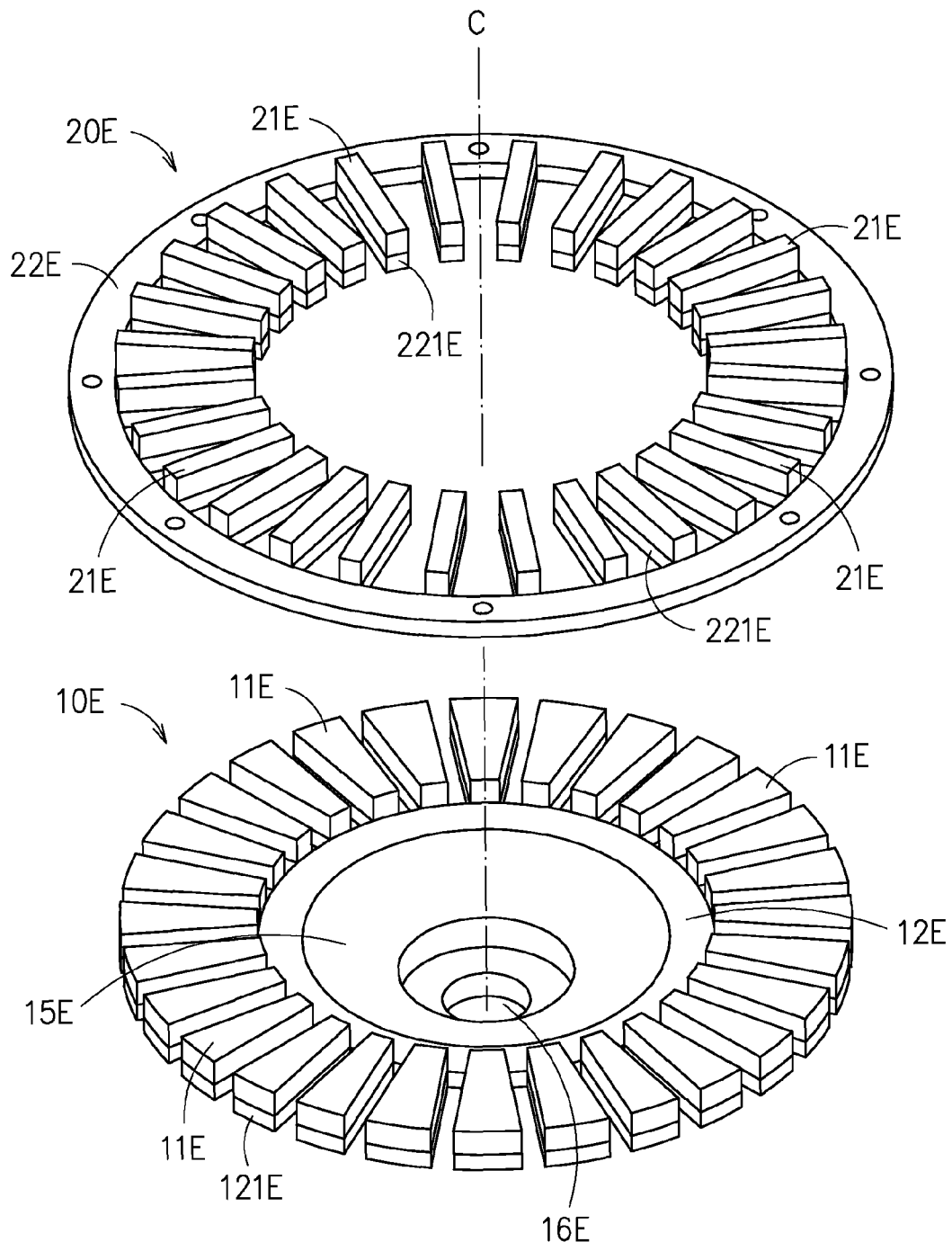
FIG. 13 is an exploded view of the axial flux Halbach rotor of FIG. 12.

In an exemplary embodiment shown in FIG. 12 to FIG. 14, an axial flux Halbach rotor of the present disclosure, being an extension of the embodiment shown in FIG. 1, is disclosed, which comprises: a first magnet set 10E and a second magnet set 20E. The first magnet set 10E includes a plurality of first magnets 11E and a ring-like first connecting element 12E with an axial direction C. Wherein, the first connecting element 12E includes a plurality of first substrates 121E that are arranged centering around the axial direction C while surrounding the outer rim of the first connecting element 12E. In this embodiment, the plural first magnets 11E are respectively disposed on the plural first substrates 121E in a one-by-one manner while allowing the plural first magnets 11E to interconnect to one another by the first connecting element 12E and simultaneously enabling the plural first magnets 11E to be arranged centering around the axial direction C while surrounding the outer rim of the first connecting element 12E. Similarly, The second magnet set 20E includes a plurality of second magnets 21E and a ring-like second connecting element 22E disposed coaxial to the axial direction C. Wherein, the second connecting element 22E includes a plurality of second substrates 221E that are arranged centering around the axial direction C while surrounding the inner rim of the second connecting element 22E. In this embodiment, the plural second magnets 21E are respectively disposed on the plural second substrates 221E in a one-by-one manner while allowing the plural second magnets 21E to interconnect to one another by the second connecting element 22E and simultaneously enabling the plural second magnets 21E to be arranged centering around the axial direction C while surrounding the inner rim of the second connecting element 22E. Nevertheless, the present embodiment is characterized in that: the first connecting element 12E further has a base 15E arranged at the inner rim thereof, and the base 15E is formed with a through penetration part 16E that is boring through the base 15E and has a center axle arranged coaxial to the axial direction C. The base 15E can be provided for some other component to mount thereat, such as a bearing, which can be assembled by inserting the driving shaft of the bearing through the through penetration part 16E of the base 15E. By the configuration of the base 15E, the connecting elements for interconnecting the magnets in the present disclosure can be used for carrying other components.

Although there are differences between the embodiments shown respectively in FIG. 1 to FIG. 14, there magnetizing directions are defined in the same way shown in FIG. 2, i.e. the first magnetizing direction is orientated parallel to the axial direction C, while the second magnetizing direction is orientated perpendicular to the first magnetizing direction. In addition, although in all the embodiments shown in FIG. 1 to FIG. 14, the first magnets are formed as a fan and the second magnets are formed in a rectangle shape, and the plural first magnets 11 and the plural second magnets 12 are alternatively disposed and inlaid to form a flat-cylinder like rotor, such configurations are adopted only for enhancing the processing convenience, but are not essential. That is, the first magnets are not necessary to be formed in a same shape and can be in any shape as required, which is also true for the second magnets. For instance, all the first and second magnets can be formed in a fan shape, or the first magnet is formed in a rectangle while the second magnet is formed as a fan.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An axial flux Halbach rotor, comprising:
a first magnet set, having a plurality of first magnets that are respectively featured by their respective first magnetizing directions and the plural first magnets are arranged interconnecting to each other by the use of a first connecting element while allowing any two neighboring first magnets to be spaced from each other by a first distance; and
a second magnet set, having a plurality of second magnets that are respectively featured by their respective second magnetizing directions and are arranged interconnecting to each other by the use of a second connecting element while allowing any two neighboring second magnets to be spaced from each other by a second distance;
wherein, the first magnetizing directions are orientated perpendicular to the second magnetizing directions; and the first magnet set and the second magnet set are arranged inlaid into each other while allowing the plural first magnets and the plural second magnets to be dispose alternatively.

2. The axial flux Halbach rotor of claim 1, wherein the first connecting element is formed as a ring with a first axial direction, and thereby, the plural first magnets are arranged centering around the first axial direction while surrounding the outer rim of the first connecting element; and the second connecting element is formed as a ring with a second axial direction that is arranged coaxial to the first axial direction, and thereby, the plural second magnets are arranged centering around the second axial direction while surrounding the inner rim of the first connecting element.

3. The axial flux Halbach rotor of claim 2, wherein each of the first magnetizing directions is orientated parallel to the first axial direction, and for each second magnet, its second magnetizing direction is orientated parallel to a tangential direction relating to the part of the ring-like the second connecting element that is positioned corresponding to the referring second magnet.

4. The axial flux Halbach rotor of claim 3, wherein the first magnetizing direction for each of the plural first magnets is a direction selected from the group consisting of: a first forward direction and a first reverse direction, that are orientated opposite to each other; and the first magnetizing directions for any two neighboring first magnets are enabled to be opposite to each other in a manner that when the first magnetizing direction of one of the two neighboring first magnets is selected to be the first forward direction, the first magnetizing direction of another first magnet will be the first reverse direction, and vice verse.

5. The axial flux Halbach rotor of claim 3, wherein the second magnetizing direction for each of the plural second magnets is a direction selected from the group consisting of: a second forward direction and a second reverse direction, that are orientated opposite to each other; and the second magnetizing directions for any two neighboring second magnets are enabled to be opposite to each other in a manner that when the second magnetizing direction of one of the two neighboring second magnets is selected to be the second forward direction, the second magnetizing direction of another second magnet will be the second reverse direction, and vice verse.

6. The axial flux Halbach rotor of claim 2, wherein the first connecting element includes a plurality of first substrates that are arranged centering around the first axial direction while surrounding the outer rim of the first connecting element; and the plural first magnets are respectively disposed on the plural first substrates in a one-by-one manner.

7. The axial flux Halbach rotor of claim 2, wherein the second connecting element includes a plurality of second substrates that are arranged centering around the second axial direction while surrounding the inner rim of the second connecting element; and the plural second magnets are respectively disposed on the plural second substrates in a one-by-one manner.

8. The axial flux Halbach rotor of claim 2, wherein the plural first magnets and the plural second magnets are alternatively disposed and inlaid to form a cylinder.

9. The axial flux Halbach rotor of claim 2, wherein each of the plural first magnets is configured with a first end and a second end that are arranged opposite to each other while allowing the first magnet to connected to the outer rim of the first connecting element by the first end, and the first end is formed in a size larger than that of the second end.

10. The axial flux Halbach rotor of claim 2, wherein for each of the plural first magnets, its surfaces whichever are disposed neighboring to one of the plural second magnets is featured by an extending direction that is parallel to the first axial direction; and that is also true for each of the plural second magnets.

11. The axial flux Halbach rotor of claim 2, wherein for each of the plural first magnets, its surfaces whichever are disposed neighboring to one of the plural second magnets is featured by an extending direction that forms an included angle with the first axial direction; and that is also true for each of the plural second magnets.

12. The axial flux Halbach rotor of claim 6, wherein for a specific amount of the first substrate that are selected from the plural first substrates, each of which is configured with a supporting panel at an end thereof that is connected to the first connecting element; and each of the supporting panels is disposed on one of the axial surfaces of the second connecting element when the first magnet set and the second magnet set are arranged inlaid into each other.

13. The axial flux Halbach rotor of claim 2, wherein the first connecting element further has a base arranged at the inner rim thereof, and the base is formed with a through penetration part that is boring through the base and has a center axle arranged coaxial to the first axial direction.

14. The axial flux Halbach rotor of claim 1, further comprising:
at least one fastening element, each being arranged at a position between any two neighboring first magnet and second magnet so as to be used for enabling the two neighboring first magnet and second magnet to inlay into each other.

15. The axial flux Halbach rotor of claim 14, wherein each of the fastening element is substantially an assembly of a protrusion and a recess that are arranged respectively on neighboring surfaces of the first and the second magnets at positions that are corresponding to each other.

* * * * *